United States Patent
Dunton et al.

(10) Patent No.: US 6,512,541 B2
(45) Date of Patent: *Jan. 28, 2003

(54) INCREASING IMAGE FIELD OF VIEW AND FRAME RATE IN AN IMAGING APPARATUS

(75) Inventors: Randy R. Dunton; Lawrence A. Booth, Jr., both of Phoenix, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,754

(22) Filed: Dec. 8, 1997

(65) Prior Publication Data

US 2001/0050712 A1 Dec. 13, 2001

(51) Int. Cl.[7] ............................................. H04N 5/235
(52) U.S. Cl. ........................ 348/230; 348/240; 348/239
(58) Field of Search .................. 348/222, 224, 348/229, 230, 240, 239, 14, 15, 18, 19, 340, 135, 169, 172; 250/203.1, 203.6

(56) References Cited

U.S. PATENT DOCUMENTS

| | | | | |
|---|---|---|---|---|
| 5,031,049 A | * | 7/1991 | Toyama et al. ............. | 348/352 |
| 5,301,244 A | * | 4/1994 | Parulski ....................... | 382/319 |
| 5,305,046 A | * | 4/1994 | Sato ............................ | 396/123 |
| 5,471,572 A | * | 11/1995 | Buchner et al. ............ | 395/139 |
| 5,572,253 A | * | 11/1996 | Ueda ........................... | 348/222 |
| 5,734,424 A | | 3/1998 | Sasaki | |
| 5,734,508 A | * | 3/1998 | Sato ............................ | 359/687 |
| 5,812,189 A | * | 9/1998 | Kimura et al. .............. | 348/240 |
| 5,822,625 A | * | 10/1998 | Leidig et al. ................ | 396/77 |
| 5,920,657 A | * | 7/1999 | Bender et al. .............. | 382/284 |
| 6,005,609 A | * | 12/1999 | Cheong ....................... | 348/169 |
| 6,005,613 A | * | 12/1999 | Endsley et al. ............. | 348/231 |

OTHER PUBLICATIONS

"Canon's Optura: A digital Camcorder That Performs Like and SLR Camera," HyperZine Manufacture's View, original posting: 1997–08–25; revised: 1997–09–03, pp. 1–3.
"From Consumer Electronics Online News: Aug. 25, 1997," HyperZine Expert's View, Original posting: 1997–08–25, pp. 1–3.

* cited by examiner

*Primary Examiner*—Wendy R. Garber
*Assistant Examiner*—Mitchell White
(74) *Attorney, Agent, or Firm*—Blakely, Sokoloff, Taylor & Zafman LLP

(57) ABSTRACT

An imaging apparatus that is configurable to operate in at least two modes. One mode is particularly suitable for still image capture, whereas the second mode is suitable for video image capture and other rapid frame rate applications. The image data in the second mode is smaller (lower resolution) than the image data obtained in the first mode. The reduction is accomplished by either digital scaling, cropping, or by a combination of optical scaling and selective readout of sensor signals. The simple digital scaling provides a fixed angular field of view for both modes of operation, while cropping alone gives a smaller field of view. Using the combination of optical scaling and selective sensor signal readout, however, provides a wider field of view for the second mode of operation while at the same time providing lower resolution images, thus improving frame rate in the second mode of operation. The embodiments can be used in a wide range of imaging applications, including digital cameras used for both still image capture and video.

17 Claims, 6 Drawing Sheets

INCREASING IMAGE FIELD OF VIEW AND FRAME RATE IN AN IMAGING APPARATUS

BACKGROUND

This invention is generally related to electronic imaging, and more particularly to changing an image field of view and image frame rate in an imaging apparatus.

Modern electronic imaging systems have become an important part of every household and business, from traditional applications such as video cameras and copiers to more modern ones such as the facsimile machine, scanner, medical imaging devices, and more recently, the digital camera. The digital camera has been developed as a portable system that acquires and stores detailed still images in electronic form. The images may be used in a number of different ways such as being displayed in an electronic photo-album or used to embellish graphical computer applications such as letters and greeting cards. The still images may also be shared with friends via modem anywhere in the world within minutes of being taken.

Most purchasers of digital cameras have access to a desktop computer for viewing the still images. Therefore, such purchasers might also enjoy using the digital camera to communicate with another person via videoconferencing or to view images of motion in a scene. Using a digital camera as a video camera or videoconferencing tool, however, presents requirements that may conflict with those for capturing still images. For instance, due to the limited transmission bandwidth between the camera and a host computer used for viewing video images, the transmitted frames of video images must be of a typically lower resolution than still images.

To meet a given image frame rate over a limited transmission bandwidth, one solution is to simply electronically scale the detailed still image frames into lower resolution image frames prior to transmitting them. Alternatively, the detailed image can be "cropped" to a smaller size, and therefore lower resolution image. In this way, the amount of spatial data per image frame is reduced, so that a greater frame rate can be achieved between the digital camera and the host computer.

Electronic scaling and/or cropping of the detailed image, however, does not address another problem posed by videoconferencing, namely that due to close proximity of the object (a person's face or body) to the digital camera during the video phone or videoconferencing session, a wider field of view is required of the images. The field of view can loosely be thought of as relating to the fraction of the scene included in the transmitted image frame.

Digital cameras typically use an optical system with a fixed effective focal length. Although a detailed still image using such a camera could have an acceptable field of view for distant scenes, electronically scaling the image for video operation does not increase the field of view, while cropping actually decreases the field of view. Therefore, what is needed is a mechanism that allows a digital camera to capture images of close-up scenes having a wider field of view but with lower resolution, in order to increase frame rate for rapid frame rate applications such as video phones and videoconferencing.

SUMMARY

The invention in one embodiment is directed at a circuit for processing first sensor signals to yield first digital image data, where the first signals are generated by an image sensor in response to a first image of a scene projected on the sensor. The circuit is further configured to process second sensor signals to yield second digital image data having a lower resolution than the first data. The second signals are also generated by the image sensor but this time in response to a second image projected on the sensor, where the second image has a greater angular field of view but is smaller than the first image.

The circuit may be incorporated into an imaging apparatus such as a digital camera as a different embodiment of the invention. The imaging apparatus includes the image sensor coupled to an optical system, where the optical system has an adjustable effective focal length, such as in a zoom lens, in order to focus light from a scene onto the sensor to create the first and second images. The second image data is obtained through a combination of (1) the optical system being adjusted to project the second image having a wider field of view than the first image on the image sensor, and (2) the circuit processing the second sensor signals which are generated in response to the second image. The first image data is generated while the camera operates in "still" mode to capture detailed images of distant scenes, whereas the second image data results while operating in "video" mode to capture less detailed but wider angle images of near scenes typically encountered during, for example, videoconferencing.

BRIEF DESCRIPTION OF THE DRAWINGS

These and other features as well as advantages of the different embodiments of the invention will be apparent by referring to the drawings, detailed description, and claims below, where:

DETAILED DESCRIPTION

As briefly summarized above, the embodiments of the invention are directed at an apparatus and associated method for capturing images having increased angular field of view and at the same allowing an increased frame rate due to their lower resolution. The techniques are particularly suitable for an imaging system such as a digital camera that operates in at least two modes to provide still and video images. The video images have lower resolution but a greater angular field of view than the still images. The greater angular field allows the video images to capture close-up scenes that are typically found in videoconferencing sessions, while their lower resolution permits the transmission of images at a higher frame rate to a host processor over a limited transmission bandwidth. The method and apparatus embodiments of the invention achieve such a result by a combination of optical scaling to obtain a smaller image size for video mode, and selectively reading only those sensor signals which are generated in response to the smaller image.

For purposes of explanation, specific embodiments are set forth below to provide a thorough understanding of the invention. However, as understood by one skilled in the art, from reading this disclosure, the invention may be practiced without such details. Furthermore, well-known elements, devices, process steps, and the like, are not set forth in detail in order to avoid obscuring the invention.

Figure 1:
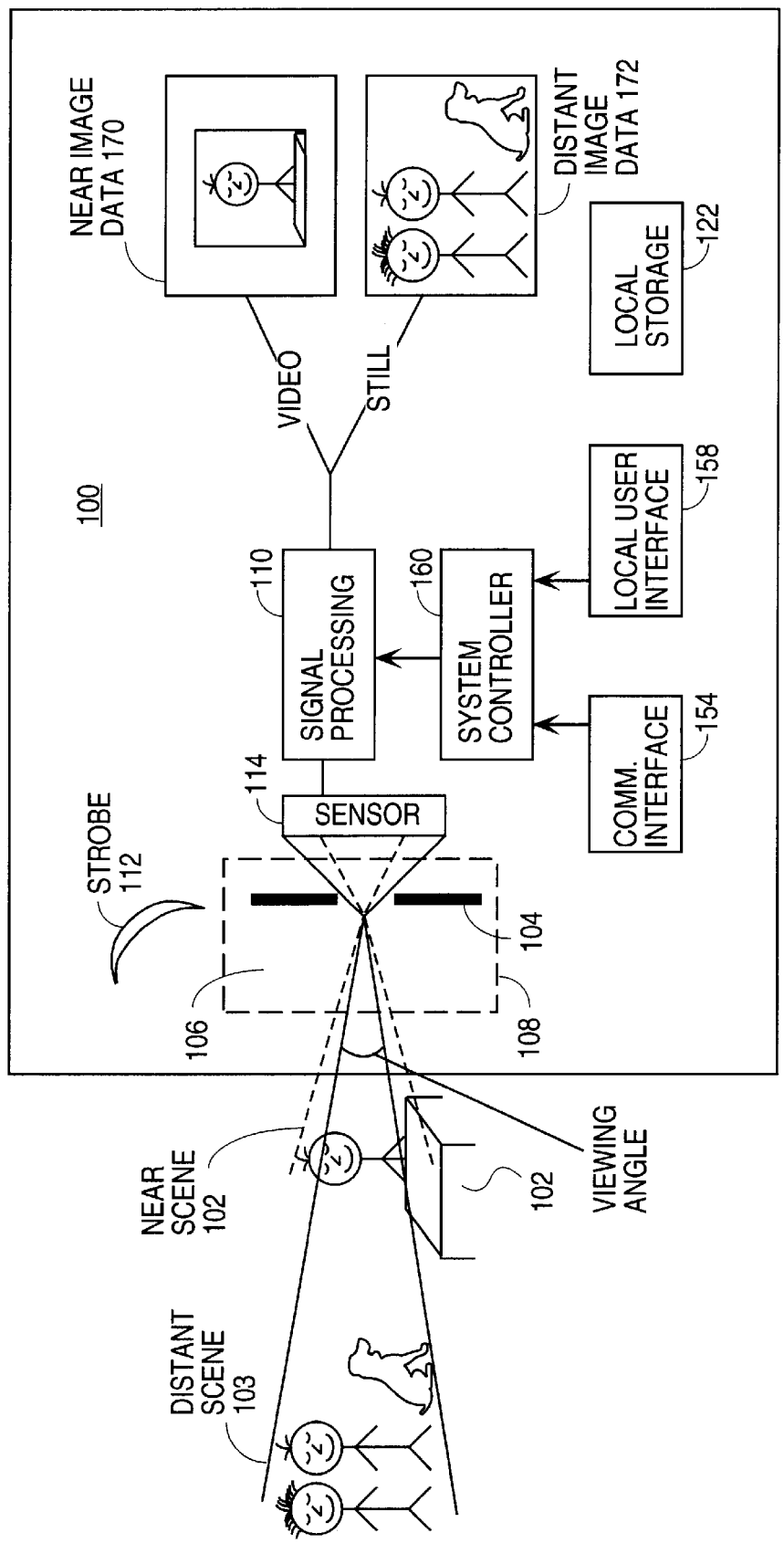
FIG. 1 illustrates a digital image capture apparatus providing images in dual mode according to a first embodiment of the invention.

FIG. 1 shows a digital image capture apparatus 100 according to a first embodiment of the invention. The apparatus 100 has an optical system 108, including a lens system 106 and aperture 104, for being exposed to incident light reflected from a scene whose image is to be captured. For this embodiment, two scenes in particular are identified, a near scene 102 and a distant scene 103. The near scene may be, for instance, a videoconferencing session where a user is sitting at a desk with the apparatus 100 positioned approximately 2 feet in front of the user. The distant scene 103 includes the presence of objects that are located farther away from the apparatus 100, e.g., 8–10 feet, such as when taking still images.

The apparatus 100 may also include a strobe 112 or electronic flash for generating supplemental light to further illuminate the scenes when the apparatus 100 is operating under low light conditions.

The optical system 108 channels the incident light rays onto an electronic image sensor 114. The image sensor 114 has a number of pixels or photocells (not shown) which are electrically responsive to incident light intensity, and, optionally, to color. Each of the pixels in the sensor 114 generates a sensor signal that together represent a captured image with sufficient resolution to be acceptable as a still image. Contemplated resolutions include 640×480 and higher for acceptable quality still images.

The sensor 114 generates sensor signals in response to an image of a scene formed on the sensor. The signal processing block 110 then processes the sensor signals into captured digital image data representing the image projected on the sensor 114. An analog-to-digital (A/D) converter (not shown) may be included in the sensor 114, as part of the same single integrated circuit die, to generate digital sensor signals (one per pixel) that define a digital image of the exposed scene.

The captured image data include near image data 170 and distant image data 172. These are obtained in part by adjusting the optical system 108 to change its focal length and, more generally, its modulation transfer function (MTF), to focus images of either the near scene 102 or distant scene 103 onto the sensor 114 at the focal plane of the optical system. The signal processing unit 110 processes the sensor signals according to image processing methodologies to yield the near image data 170 or the distant image data 172. The near image data may be provided as video images which are streamed to an image processing system such as a host computer (not shown) via the communication interface 154. The larger and greater resolution distant image data may also be transferred to the host via the interface 154, but at a lower frame rate. The image data is then decompressed (if necessary), rendered, and/or displayed in the host computer.

The image data, particularly the distant (or still mode) image data, may optionally be stored in a local storage 122 aboard the apparatus 100. The local storage 122 may include a FLASH semiconductor memory and/or a rotating media device such as a hard disk. The FLASH memory may be removable, such as the Intel® Miniature Card. The rotating media may also be removable or fixed, and may be of the magnetic disk or other type suitable for storing image data files.

The apparatus 100 can be configured to operate in at least two modes. A first mode generates near image data 170, suitable for video operation. A second mode generates distant image data 172, suitable for still image capture. Mode selection can be made by the user via mechanical control (not shown) on the apparatus 100. Mechanical knob settings can be received and translated by a local user interface 158 into control signals and control data that is processed by a system controller 160. Alternatively, the apparatus 100 can be tethered to the host computer (not shown) such as a personal computer (PC) via the communication interface 154. The user can then make the mode selection through software running on the host which in turn communicates the proper control signals and data to the system controller 160.

The system controller 160 orchestrates the capture of images in both modes of operation in response to the mode selection made by the user. In particular, the system controller configures the signal processing block 110 to provide the near or distant image data as described in greater detail below.

Figure 2:
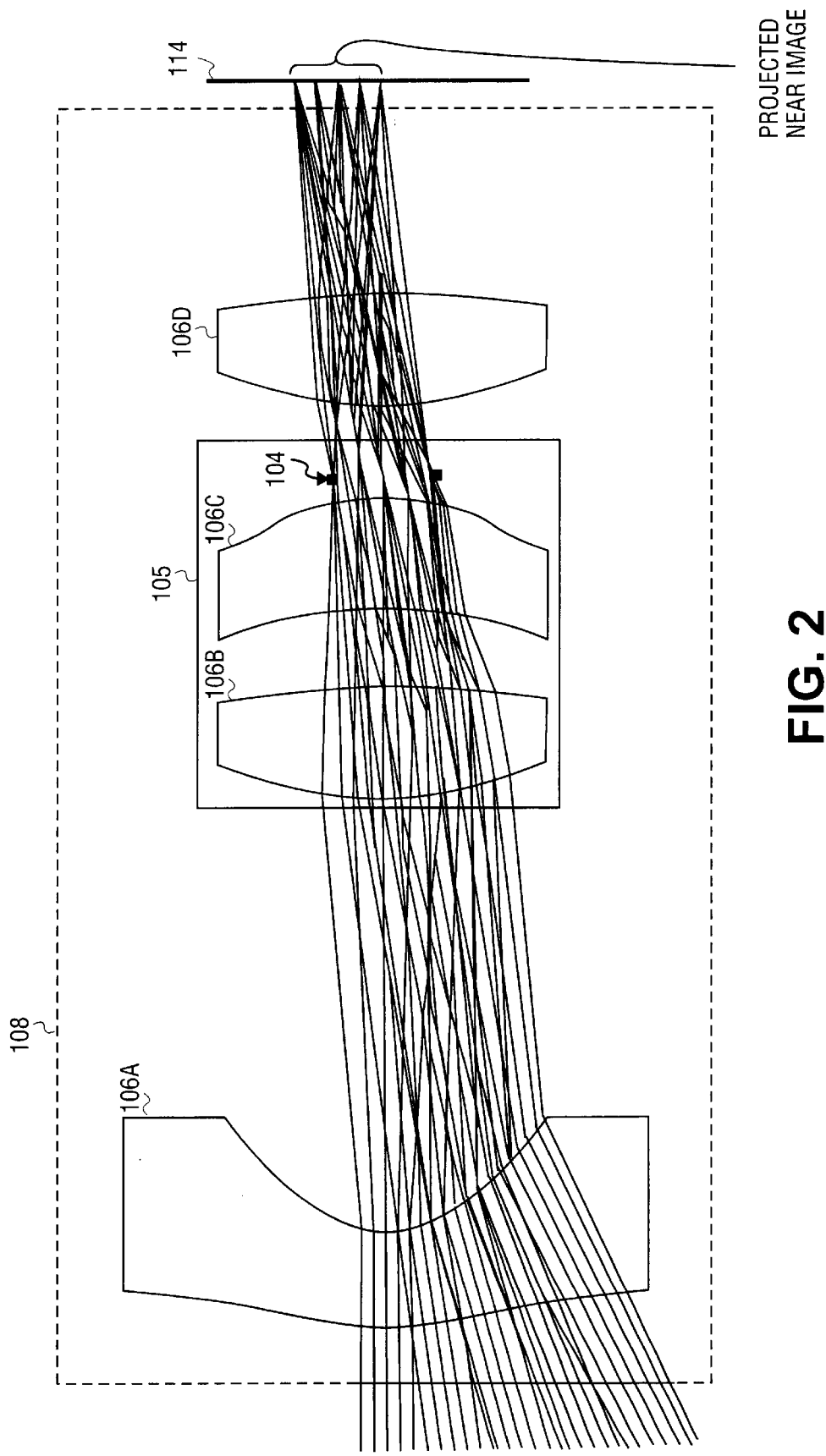
FIG. 2 illustrates the detail in an embodiment of the optical system used in the imaging apparatus to generate a near image.
Figure 3:
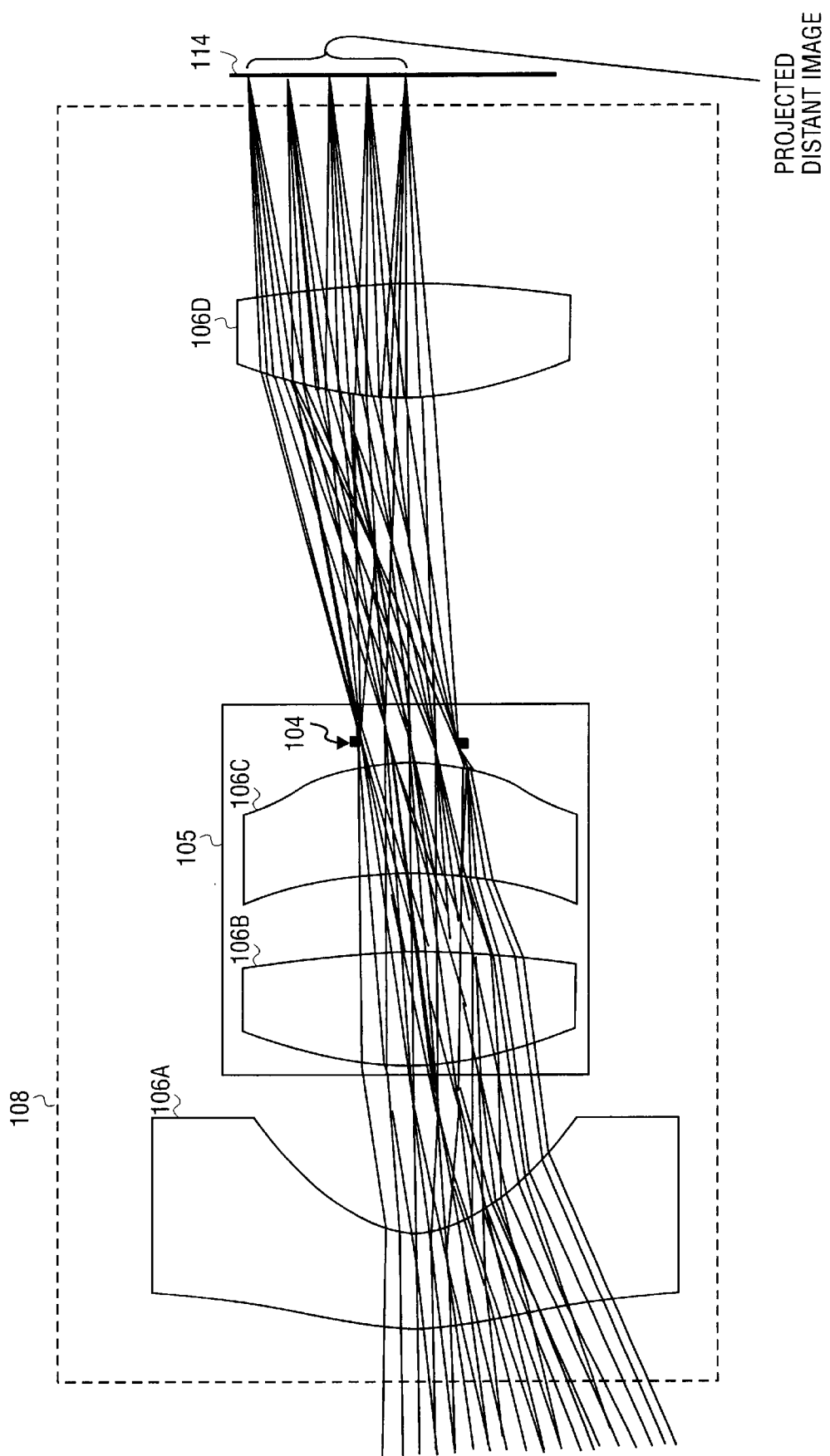
FIG. 3 illustrates detail in the optical system that generates a smaller field of view but larger image, according to another embodiment of the invention.

In the first embodiment of the invention, the effective focal length of the optical system 108 must be altered between the different modes. FIGS. 2 and 3 illustrate two different settings of the optical system 108 corresponding to the two different modes of operation for the apparatus 100. The optical system 108 as shown includes a lens system 106 consisting of four lens elements 106a–d that are positioned in front of the sensor 114. An adjustable or movable lens and aperture combination 105, such as a zoom lens, is also included. The zoom lens or combination 105 can be moved by the user actuating a lever, ring, or by an electromechanical mechanism such as a solenoid or motor. The lens combination 105 includes lens elements 106b, 106c as well as the aperture 104. For clarity, only the light rays from the lower half of the scenes are shown in the figures. Although optical system 108 is shown as a lens system having four separate lenses and a fixed aperture 104, one skilled in the art will recognize that other variations are possible which yield a smaller near image with greater angular field of view.

By simply adjusting the position of combination 105 from a near position in FIG. 2 to a distant position in FIG. 3, the size of the image projected onto sensor 114 can be increased. This optical scaling feature results in a larger image size for the still image (distant image data) mode of operation.

The other significant characteristic of the optical scaling is the change in angular field of view. The angular field of view can loosely be thought of as relating to the fraction of the scene included in the image projected onto the sensor 114. Thus, although the projected image in FIG. 2 is smaller than that of FIG. 3, a greater fraction of the scene is included in the near image of FIG. 2 as shown by the additional light rays that enter the optical system 108 through the first lens 106a.

Figure 4:
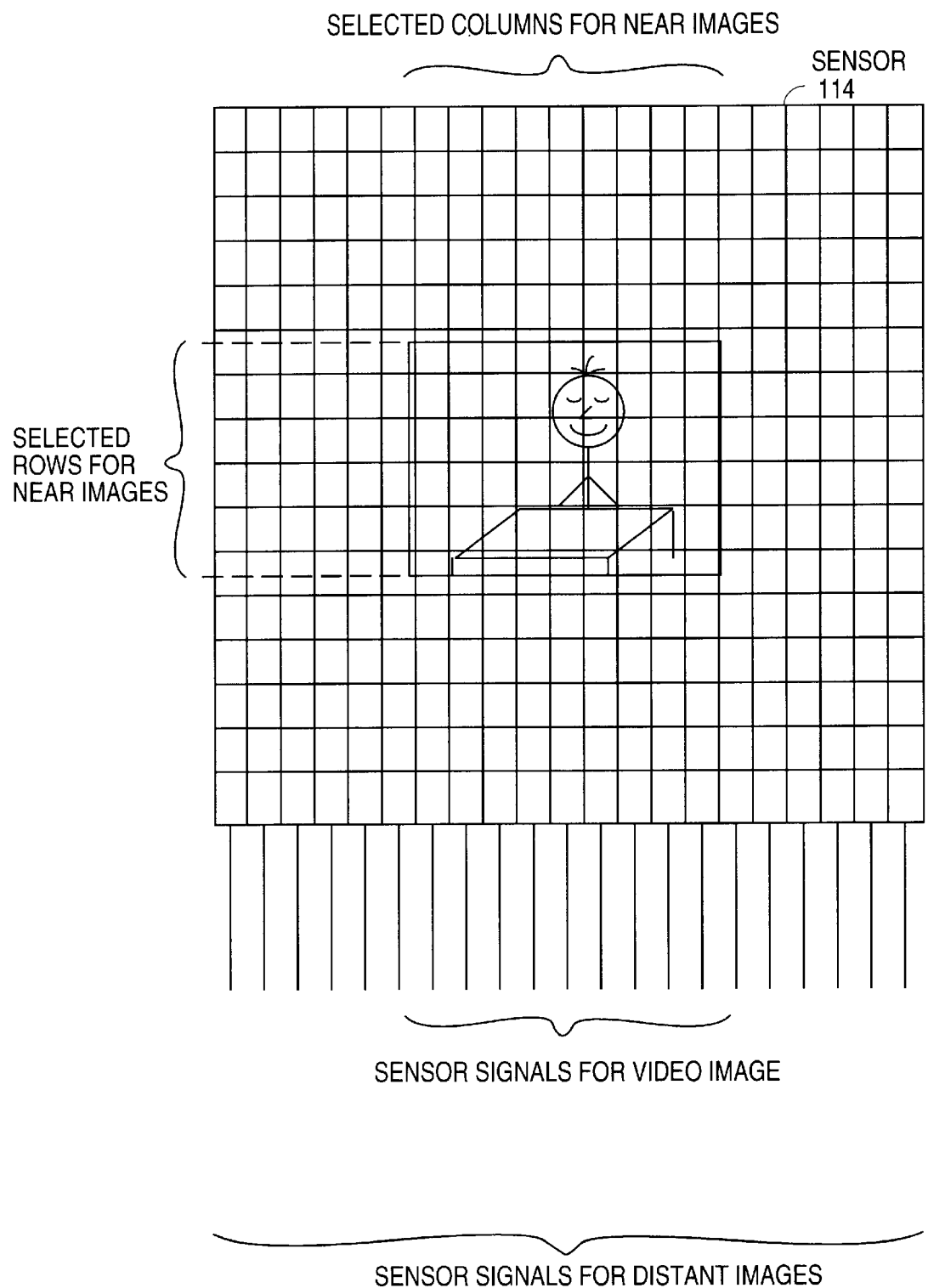
FIG. 4 is a diagram of an image sensor with a projected near image and the associated sensor signals to be processed by a circuit embodiment of the invention.

In order to obtain the smaller near image data 170 and greater frame rate when the apparatus 100 is configured with the optical system 108 in the near position, the signal processing block 110 and the sensor 114 are configured (by control signals and data received from the system controller 160, see FIG. 1) to process only the pixel signals originating from those rows and columns of the sensor 114 that define the region on which the smaller image is formed. This can be seen in FIG. 4 which shows a near image being formed on an array of pixels in the sensor 114 and using fewer bitlines than the maximum resolution of the array. Instead of reading all of the sensor signals (which can be read for obtaining the maximum resolution of the image sensor array) shown in FIG. 4, only those sensor signals coming from the pixels in those rows and columns which define the region of the near image are read. The fewer sensor signals result in both lower processing times in the signal processing block 110, and greater image frame rate through a limited bandwidth interface between the sensor 114 and signal processing block 110. This in turn results in greater image frame rate through the host communication interface 154 (see FIG. 1).

The image data can be further compressed and/or scaled by the signal processing unit 110 as discussed below in connection with FIGS. 5 and 6 in order to increase the frame rate while transmitting the images through a bandwidth-limited communication interface 154.

To further reduce the cost of manufacturing an apparatus 100 that operates in both still capture and video modes, optical system 108 can be fixed to project images on the sensor 114 having approximately 55° of angular field of view. Such a field of view may be an acceptable compromise for both the near and distant scenes. The distant scene would be captured as a detailed still image, while the near scene (e.g., videoconferencing session) would be handled by digitally scaling (using the signal processing unit 110) the detailed still image to reduce its resolution. This gives greater frame rate for the video images, but no increase in the field of view as compared to still images. Embodiments of the signal processing unit 110 are shown in FIGS. 5 and 6 and described below.

To summarize, the above-described embodiments of the invention are an imaging apparatus (such as a digital camera), a method performed using the imaging apparatus, and a circuit that provides analog and digital processing, for increasing image field of view while at the same time increasing the image frame rate. The embodiments of the invention are, of course, subject to some variations in structure and implementation. For instance, the embodiment of the invention as signal processing block 110 can be implemented entirely in analog and hardwired logic circuitry. Alternatively, the digital scaling and compression functions of the signal processing block 110 can be performed by a programmed processor. Therefore, the scope of the invention should be determined not by the embodiments illustrated but by the appended claims and their legal equivalents.

Signal Processing Architecture

Figure 5:
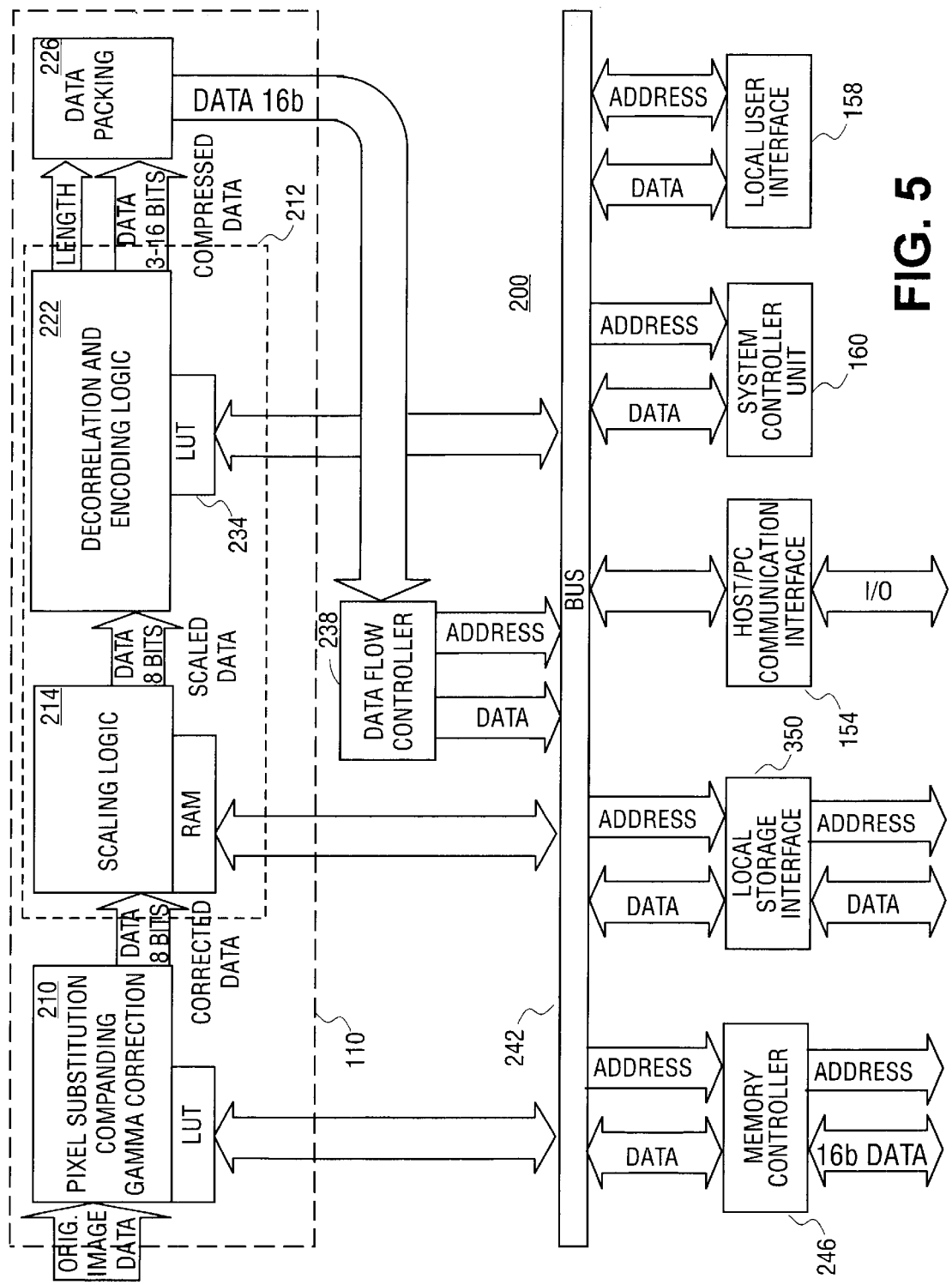
FIG. 5 shows a data flow diagram of the path taken by image data for video and still modes of operation.

The image capture apparatus 100 can be electronically configured for dual mode operation by configuring the signal processing block 110 to provide either still image data or a sequence of video images using the logical block diagram and architecture of FIG. 5. In one embodiment, the block 110 implements digital signal and image processing functions as logic circuitry and/or a programmed data processor to generate compressed image data having a predefined resolution and compression ratio from detailed, original image data received from the sensor 114.

FIG. 5 shows a data flow diagram for an embodiment of the invention of the path taken by image data for both video and still modes of operation. The processing block 110 includes a chain of imaging functions which may begin with a correction block 210. The correction block 210 is used whenever the quality of the original image data received from the sensor 114 warrants some sort of pre-processing before the image is scaled and compressed. In certain cases, the correction block 210 performs pixel substitution, companding, and gamma correction on the original image data received from the image sensor. The original image data should be of sufficient detail (e.g., 768×576 spatial resolution or higher is preferred) to yield still images of acceptable quality.

Pixel substitution may be performed in block 210 to replace invalid pixel data with valid data to provide a more deterministic input to subsequent imaging functions. Companding may be performed to lower the resolution of each pixel (the number of bits per pixel). For example, the original image data can arrive as 10 bits per pixel, whereas a preferred pixel resolution for the logic circuitry may be 8 bits (1 byte). Conventional gamma correction may also be performed to conform the information content of the image to that expected by the host computer where the image will be ultimately displayed.

Other functions that may be performed in block 210 on each received original image frame include fixed pattern noise reduction which is often needed before compressing an image. Once again, whether or not any correction functions are performed by block 210 in general depends on the quality of the original image data received from the sensor 114 and any subsequent image processing such as scaling or compression to be performed before the image data is ready for storage or transmission to the host computer.

Once the original image data has been corrected or otherwise processed into the desired size or format by correction block 510, the corrected data may be scaled and compressed if needed to meet the transmission and storage requirements of the communication interface 154 and the optional local storage 122 (see FIG. 1). To meet such requirements, the processing block 110 can include scaling and compression logic 514 to perform any necessary image scaling and compression prior to transmission and storage.

For instance, the scaling and compression logic 214 may be configured to reduce image size and resolution to yield smaller, less detailed video images, as compared to larger and more detailed still images. Smaller and less detailed image data may be required in order to transmit a rapid sequence of video images that are to be decompressed and viewed in a host/PC. However, if the transmission link between the apparatus 100 and the host/PC has sufficient bandwidth to transmit a sequence of detailed original image data at the needed rate to the host/PC, then the scaling and compression logic 514 can be simplified or even eliminated for both still or video operation.

A number of digital image processing functions are contemplated for the logic 514. These or others similar in function may be configured as described below by one skilled in the art depending on the performance (speed of rendering the compressed image data) and image quality desired. The imaging functions have been implemented in one embodiment as separate units of logic circuitry as seen in FIG. 5. The functions are described as follows in conjunction with the flow diagram of FIG. 6.

The logic 514 can perform a 2-D spatial scaling of the corrected image data in order to yield smaller images that may be easier to store or transmit. The scaling is done according to a selected scaling ratio using conventional known techniques. The scaling ratio may be integer or fractional. The scaling can be performed in a 2-dimensional fashion by, for instance, utilizing two separate 1-dimensional scaling processes.

The logic 514 can be used for both video and still image capture simply by selecting the appropriate scaling ratio, as indicated in step 614. For instance, a 4:1 sub-sampling of the corrected image may be performed in video mode so that 16 pixels from the corrected image data are averaged together to produce 1 pixel in the scaled image data. Based on standard sampling theory, and assuming uncorrelated noise sources, the sub-sampling may also improve the signal to noise ratio by $\sqrt{16}$, or a factor of 4. Lower scaling ratios such as 2:1 may also be used, where 4 pixels are averaged to generate a single pixel in the scaled image data, resulting in a signal to noise ratio (SNR) improvement of 2. By scaling the more detailed corrected image data in this way during operation in video mode, the imaging system compensates for the increased noise due to lower light levels that are typically encountered with video operation, such as during videoconferencing. The scaling step, if needed, appears as step 618 in FIG. 6.

Next in the chain of imaging function blocks in FIG. 5 is the decorrelation and encoding logic 522. The scaled image data received from the logic 514 is decorrelated by logic 522 in preparation for entropy encoding as indicated in step 622, according to a selected one of a number of decorrelation methodologies. Once again, the user may select a particular decorrelation methodology that is suitable for obtaining the normally smaller size video images, as indicated in step 614.

The decorrelation function can generate error image data as differences between neighboring pixels. One particular method that can be used for image decorrelation is digital pulse code modulation (DPCM). To obtain more compression of the image data, if needed, for example, in transmitting a large number of video image frames, "loss" may be introduced in the form of "quantization" (mapping a first set of data to a smaller set of values) errors using DPCM.

The next stage in the chain of imaging function blocks is entropy encoding, also performed by logic 522. The technique uses a variable length encoding technique to compress the decorrelated image data, if needed, in step 626. For instance, a commonly known entropy encoding methodology that may be used is Huffman encoding. Entropy encoding involves replacing symbols in the decorrelated image data by bit strings in such a way that different symbols are represented by binary strings of different variable lengths, with the most commonly occurring symbols being represented by the shortest binary strings. The logic 522 thus provides compressed image data having variable size, for instance as seen in FIG. 5 where the scaled 8-bit data is encoded into compressed data having variable size of 3–16 bits.

Once again, the encoding methodologies for obtaining video and still images can be different and may be selected, as indicated in step 614, depending on the mode of operation identified earlier in step 610. For instance, a larger set of symbols (having variable binary string lengths) may be used for encoding still image data as compared to video image data. This is because there may be more time allocated in the host/PC to decompress still images than to decompress video images. In contrast, for encoding video images, a more limited set of symbols having uniform binary string lengths should be employed to obtain faster decompression of a series of video image frames. In addition, having a uniform binary string length allows usage of a fixed amount of bandwidth to transmit the image data that is specifically suitable for a host/PC interface such as the Universal Serial Bus (USB).

The image processing system shown in FIG. 5 includes additional logic that facilitates the dual mode operation described above. In particular, the logic circuitry in blocks 510, 514, and 522 use programmable look-up tables (LUTs) 533, 534, and 535 and random access memories (RAMs) 535 for flexibility in performing their respective imaging functions. Each LUT or RAM provides information to its respective imaging function logic as specified by the selected methodology for the particular mode of operation. For instance, the scaling logic 514 uses a RAM 235 as a storage area to store intermediate scaling computations. Also, the LUT 534 for the decorrelation and encoding logic 522 can be loaded with different rules and data required for performing decorrelation and encoding as known in the art, depending on whether a still or a video image is desired. In a particular embodiment, two look-up tables (LUTs) are used for LUT 534, one for listing the characters (a so-called "code book") and one for listing the string lengths.

Different techniques may be used to determine the proper values to be loaded into the RAM and LUTs. For instance, image metering may be performed by the controller 160 to determine lighting and other factors which impact decorrelation and entropy encoding. Also, as mentioned earlier, transmission and storage constraints may dictate greater compression, especially during video operation where a large number of image frames are generated, so that the LUTs for decorrelation and entropy encoding will include a smaller code book for compression of the image data.

Although the different LUTs and RAM described above may be implemented as part of a single, physical RAM unit or alternatively may be combined in different combinations as one or more RAM units, each LUT and RAM is preferably implemented in a physically separate unit to obtain faster performance of the imaging functions.

After the image data has been compressed according to the desired mode by the compression logic 512, the now variable size data is then passed to the data packing unit 526 where the data is packed into constant size, and therefore more manageable, data segments for more efficient storage and transmission over a computer bus. Once again, if the image data from the sensor 114 is sufficiently acceptable as is, and there are no further transmission or storage constraints on such data, then the data packing unit becomes superfluous, since the sensor image data has a constant size and can be easily stored or transferred outside the imaging apparatus with minimal processing.

In the data packing unit 526, received data blocks of different size are packed into blocks having a predefined, constant size, as indicated in step 630. For example, in FIG. 5, the data packing unit packs the variable size compressed image data into 16-bit blocks. The 16-bit blocks are then forwarded to a data flow controller 538 such as a Direct Memory Access (DMA) controller, which then adds address information to each data block before accessing a bus 542 in order to forward the 16-bit blocks onto the bus. The memory controller 546 accepts the 16-bit blocks over the bus 542 and stores them temporarily in memory such as dynamic RAM (DRAM) (not shown) aboard the apparatus 100.

After being packed, the still image data may then be transferred over the bus 542 to the optional local storage 122 (see FIG. 1) via a local storage interface 550 coupled to the bus. For instance, the local storage device 122 may be a removable FLASH memory card which receives the image data prepared as a "file", including compression tables, file headers, time and date stamps, and metering information attached to the image data. The card may then be removed from the apparatus 100 and inserted into a PC to transfer the still image data for decompression, viewing and/or further processing in the PC.

As an alternative to using a removable storage device, the communication interface 154 may be used to transfer both the still and video images outside the apparatus 100. This may be accomplished by preparing the still image data as a disk file appropriate for transmission using the particular bus standard used in the communication interface 154, to be transferred to a host computer for storage and access by a host processor (not shown). The video image data can be streamed according to known techniques to the host computer via the controller interface according to a peripheral bus standard such as USB or IEEE 1394-1995.

The dual mode operation of the image capture apparatus 100 has been described in the context of a bus-based image processing architecture shown in FIG. 5. To further facilitate software control of the different modes of operation in this architecture, a number of memory-mapped control registers (not shown) may be coupled to the bus 542 to allow the controller 160 to configure the apparatus 100 with the desired mode of operation. Instructions can be provided for execution by the system controller 160 to access the LUTs, RAM, and control registers via the bus 542 in order to program the parameters needed for the proper image processing methodologies of the selected mode of operation. For instance, the different rules and parameters for scaling, decorrelation, and entropy encoding methodologies for all modes of operation may be stored as controller instructions aboard the apparatus 100 during manufacture, where each mode of operation is assigned a different set of methodologies. The appropriate set can be loaded into the processing block 110 in response to a mode selection by the user, made through either the local user interface 158 or the host/PC communication interface 154.

Although the embodiment of the processing block 110 described above in connection with FIG. 5 is implemented as logic circuitry, the image processing system of FIG. 5 may alternatively be equipped with a programmed high performance processor executing instructions to perform the digital imaging functions of the block 110. Exemplary steps that may be performed by such a processor are illustrated in FIG. 6, and were described above simultaneously with the logic circuitry embodiment in FIG. 5. The sequence of steps in FIG. 6 may be performed by the system controller 160, or by a separate, dedicated processor (not shown) that is also coupled to the bus 542.

Figure 6:
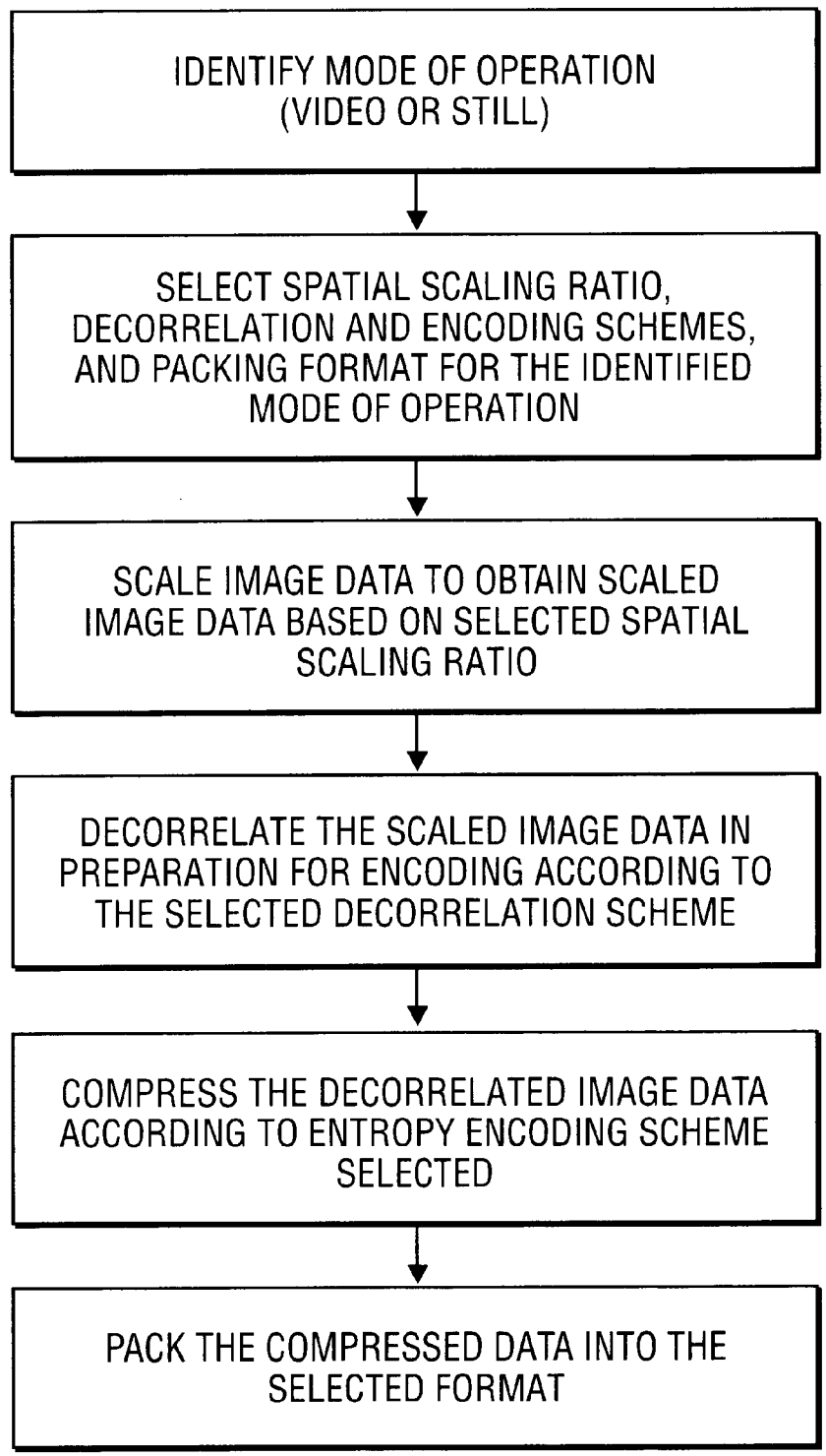
FIG. 6 illustrates a flow diagram of imaging operations that can be performed by the embodiment of FIG. 5.

To summarize, the above described embodiments of the invention in FIGS. 5 and 6 may be used in an apparatus such as a digital camera that operates in both still mode (for capturing still images as a portable camera) and in video mode (where the digital camera is tethered via a computer peripheral bus interface to a host computer or other image viewing system). The camera has an image sensor and a video and still processing block 110 that is configured to capture detailed images in still mode, in both outdoor and indoor scenes. In video mode, the camera may be configured to compress a sequence of the detailed images (if needed for transmission and storage) using the same processing block 110 in order to capture a video sequence that can be transmitted to the host computer for viewing via a computer peripheral bus interface.

The embodiments of the invention described above in FIGS. 5 and 6 are, of course, also subject to some variations in structure and implementation. For instance, although the image data path in the processing block 110 is shown as being 8 bits wide initially and up to 16 bits when compressed, one skilled in the art will recognize that the invention can be implemented using other data path widths. Also, the system controller 160 may be combined with the data flow controller 538 into one physical, integrated circuit unit such as a microcontroller.

Therefore, the scope of the invention should be determined not by the embodiments illustrated but by the appended claims and their legal equivalents.

What is claimed is:

1. A circuit for use in a digital camera to capture digital images of near and far scenes, comprising:

a signal processing circuit that can be configured to operate in a still capture mode and a video capture node, in the still capture mode the circuit is to process first pixel signals that define an electronic still image of a far scene, the first pixel signals to be generated by a first pixel area of a sensor area of a sensor array in response to the pixel area being illuminated by an optical image of the far scene, and in the video capture mode, the signal processing circuit is to process second pixel signals that define each of a plurality of electronic images of a near scene, the plurality of electronic images of the near scene to be prepared for transmission to a display device via a computer peripheral bus, the second pixel signals to be generated by a second pixel area of the sensor array in response to the second area being illuminated by a plurality of optical images of the near scene, the optical images of the near scene being smaller than the optical image of the far scene so that the second area is smaller than the first area and the second signals are a subset of the first signals, the circuit is to process the second signals and not others of the first signals in the video capture mode.

2. The circuit of claim 1 wherein the first signals are digital signals, and the signal processing circuit includes digital signal and image processing circuitry to form the digital images.

3. The circuit of claim 1 wherein the first signals are analog signals, and the signal processing circuit includes an analog to digital converter to convert the analog signals into digital signals, and the processing of the first and second signals includes converting them from analog into digital form.

4. The circuit of claim 3, wherein the signal processing circuit is to read the second pixel signals but not others of the first pixel signals and then digitally process the second pixel signals but not others of the first pixel signals.

5. The circuit of claim 1 wherein the first signals represent the maximum resolution of the sensor array.

6. A method comprising:

selecting a still capture mode of operation in a digital camera; and then processing first pixel signals that define an electronic still image of a far scene, the first pixel signals being generated by a first pixel area of an image sensor array in response to the pixel area being illuminated by an optical image of the far scene; and then selecting a video capture mode of operation in the digital camera;

adjusting an optical system coupled to the image sensor array, to form an optical image of a near scene on a second pixel area of the image sensor array that is smaller than the first area, the optical near image being smaller than and having a greater angular field of view than the optical far image; and then processing second pixel signals that define each of a plurality of electronic images of the near scene, the second signals being a subset of the first signals and being generated by the second pixel area in response to that pixel area being illuminated by the optical near image; and further transmitting the plurality of images of the near scene to a display device via a computer peripheral bus, to display motion in the near scene.

7. The method of claim 6 wherein the first signals are digital signals.

8. The method of claim 6 wherein the first signals are analog signals.

9. The method of claim 8, wherein processing second pixel signals comprises:

reading the second pixel signals but not others of the first pixel signals; and then digitally processing the second pixel signals but not others of the first pixel signals.

10. The method of claim 6 wherein the first signals represent the maximum resolution of the sensor array.

11. The method of claim 6 wherein the adjusting of the optical system includes moving a lens of the system to change the effective focal length of the optical system.

12. An imaging system comprising:

an image sensor array having a first pixel area and a smaller second pixel area;

an optical system to focus light from a scene onto a focal plane at which the sensor array is disposed, the optical system being adjustable to change its effective field of view of a near scene and a far scene;

means for processing first pixel signals that define an electronic still image of the far scene, the first pixel signals to be generated by the first pixel area in response to the area illuminated by an optical image of a far scene when the system is configured in a still capture mode of operation;

means for processing second pixel signals that define a plurality of images of the near scene, the second signals to be generated by the second pixel area in response to the second area being illuminated by a plurality of optical images of the near scene when the system is configured in a video capture mode of operation, the optical images of the near scene being smaller than the optical image of the far scene, the second signals being a subset of the first signals and said second pixel processing means to process the second signals and not others of the first signals video) capture mode; and a computer peripheral bus interface to transmit the plurality of electronic images of the near scene to a video display.

13. The system of claim 12 wherein the first signals are digital signals.

14. The system of claim 12 wherein the first signals are analog signals.

15. The system of claim 14, wherein the means for processing second signals is to read the second pixel signals but not others of the first pixel signals and then digitally process the second pixel signals, but not others of the first pixel signals.

16. The system of claim 12 wherein the processing means includes a processor.

17. The system of claim 12 further comprising:

a system controller coupled to configure the processing means to capture near and far images.

* * * * *